2,999,088
POLYMERISATION PROCESS
Donald Alexander Fraser, Sutton, and Alaric Louis Jeffrey Raum, Teddington, England, assignors to The Distillers Company Limited, Edinburgh, Scotland, a British company
No Drawing. Filed Aug. 26, 1957, Ser. No. 680,400
Claims priority, application Great Britain Sept. 15, 1956
11 Claims. (Cl. 260—94.3)

The present invention relates to the polymerisation of conjugated alkenes and their polymerisable homologues. The word "polymerisation" is used throughout this specification to include copolymerisation reactions. Conjugated alkenes are well known, the simplest and one of the most widely used being butadiene-1,3.

Many processes for the polymerisation of butadiene-1,3 and similar unsaturated hydrocarbons are known and from them a wide variety of rubber-like polymeric products have been obtained.

An object of the present invention is to provide a new process for the polymerisation of conjugated alkenes which gives rise to rubber-like polymeric products having a combination of useful properties. A further object is to provide a polymerisation process for conjugated alkenes which can be carried out at normal, ambient temperatures and pressures.

According to the present invention the process for the polymerisation of a conjugated alkene comprises contacting the alkene in a liquid reaction medium with a polymerisation initiator system formed by mixing lithium borohydride with a halide of a metal selected from the group consisting of titanium, zirconium and vanadium.

By a conjugated alkene is meant throughout this specification an aliphatic or cyclo-aliphatic hydrocarbon possessing at least two polymerisable ethylenic double bonds which together form a conjugated system. Aryl substituted derivatives of such compounds can also be employed. Examples of conjugated alkenes are butadiene-1,3; isoprene; piperylene; chloroprene; 2,3-dimethylbutadiene-1,3; 2-ethyl-butadiene-1,3; 4-methyl-pentadiene-1,3; 2-methyl-pentadiene-1,3; hexadiene-2,4; hexatriene-1,3,5; 4-methyl-hexadiene-1,3; 2-methyl-hexadiene-2,4; 2,4-dimethyl-pentadiene-1,3; 2-isopropyl-butadiene-1,3; 1,1,3-trimethyl-butadiene-1,3; octatriene-2,4,6; octadiene-2,4; 2,5,5-trimethyl-hexadiene-1,3; 2-amyl butadiene-1,3; 1,1-dimethyl - 3 - tertiary butyl butadiene - 1,3; 2-neopentyl-butadiene-1,3; myrcene; allo-ocimene and analogues; cyclopentadiene; cyclo-hexadiene-1,3; cycloheptadiene-1,3; dimethyl fulvene and analogues; 2-phenyl-butadiene-1,3; 2,3-diphenyl-butadiene-1,3; and diphenyl-fulvene and analogues. Mixtures of one or more conjugated alkenes in any desired proportions may be copolymerised according to the process of the present invention.

The conjugated alkenes can be mixed with other copolymerisable compounds in carrying out the present invention and thus valuable copolymers can be obtained. The most valuable copolymers contain at least 50% by weight of polymerised conjugaed alkene. Suitable copolymerisable compounds are mono-olefinic compounds such as for example ethylene, propylene, butene-1, butene-2 and higher mono-olefinic alkenes. Mono-olefinic cyclo-aliphatic compounds such as cyclohexene, methyl cyclohexene and cycloheptane and mono-olefinic aryl substituted alkenes such as styrene, $\alpha$-methyl styrene, the ortho-, meta- or para-methyl styrenes, allyl benzene, allyl toluene, vinyl naphthalene and indene are also suitable. Polyolefinic non-conjugated hydrocarbons such as for example, allene, di-allyl, di-methallyl, squalene, 1-vinyl cyclohexene-3, divinyl benzene and its analogues can also be copolymerised with conjugated alkenes according to the present invention.

Lithium borohydride is a well defined crystalline solid to which has been ascribed the formula $LiBH_4$. It is readily available and relatively easy to prepare. It has the particular advantage that it is substantially unaffected when exposed to dry air for long periods of time.

The polymerisation initiator system is formed by mixing the lithium borohydride with a halide of titanium, zirconium or vanadium. The most suitable halides are the tetrachlorides of titanium and vanadium. Examples of other suitable compounds are titanium tetraiodide, titanium trichloride, zirconium tetrachloride, zirconium trichloride and vanadium trichloride. Halides which are soluble in the liquid reaction medium are preferred.

Efficient polymerisation initiator systems are obtained by using titanium trichloride in its brown metastable form. Titanium trichloride as usually prepared is in the form of black or violet crystals. Brown metastable titanium trichloride can be formed by passing titanium tetrachloride and hydrogen through a silent electric discharge at room temperature.

If a solid halide, which is substantially insoluble in the liquid reaction medium is used, best results are obtained by preparing an intimate mixture of the two catalyst components. This can be achieved, for example, by ball milling the catalyst components under an inert atmosphere such as nitrogen or argon, or by treating a mixture of the catalyst components with an inert solvent for one or both of the components and subsequently removing the solvent before the polymerisation is carried out.

The proportion of lithium borohydride to the metal halide used in the preparation of the polymerisation initiator system can be varied considerably but generally from 0.3 to 3 molar proportions of the metal halide are employed with each molar proportion of lithium borohydride. For any particular system the nature of the product can be to a large extent controlled by adjusting the relative proportions of the two components in the initiator system.

The total quantity of polymerisation initiator used in the polymerisation process is not critical. For example, polymerisation may be carried out with 0.05 to 5.0 grams of initiator per 100 millilitres of reaction mixtures. It is preferred that the initiator concentration should be between 0.1 to 1.0 gram per 100 millilitres of reaction mixture.

The preparation of the initiator system by mixing its two essential components and the subsequent polymerisation reaction are preferably effected in the absence of molecular oxygen, carbon dioxide and water. Most suitably all reactions are carried out in an atmosphere of the conjugated alkene to be polymerised when it is a gas or of an inert gas, for example, nitrogen or argon, when it is a liquid. An inert gas can also be used to flush out the polymerisation vessel prior to the admission of the various components of the reaction mixture. The initiator systems are deactivated by reaction with oxygen, carbon dioxide or water and, consequently, if any of these are present in excess little or no polymerisation will take place. Small quantities of oxygen, carbon dioxide or water are removed by reaction with part of the system and any undestroyed initiator left after this reaction initiates polymerisation in the usual way.

The process of the present invention is most suitably carried out with the components of the reaction dispersed throughout an inert liquid vehicle, and when the material to be polymerised is normally a gas, the latter can be bubbled through the liquid vehicle containing the initiator system. The liquid vehicle is preferably a solvent for at least one of the compounds which react together to form the initiator system and for the monomers to be polymerised, i.e. the conjugated alkene and any copolymerisable materials present. Improved results are obtained if the liquid is a solvent for the polymer formed by the polymerisation process. The most suitable liquid vehicles are aliphatic, cycloaliphatic and hydrogenated aromatic hydrocarbons, for example, propane, butane, pentane, hexane, cyclohexane, tetrahydronaphthalene and decahydronaphthalene; the higher paraffins and aromatic hydrocarbons, for example benzene, toluene and xylene. Halogenated aromatic hydrocarbons, for example orthodichlorbenzene and chlorinated naphthalene and mixtures of these liquids may also be used. Particularly good results have been obtained when benzene has been used as diluent. The quantity of liquid vehicle employed can be varied considerably and should be such that the final recovery of the product is facilitated. If a low boiling liquid such as propane or butane is used, then the temperature and pressure must be maintained at such a level that the diluent is kept in the liquid phase during the polymerisation process. The use of a low boiling solvent may be advantageous in some cases as it facilitates its removal and recovery after the reaction has been carried out.

If the monomer to be polymerised is normally a liquid, under the conditions of the reaction, the process can be carried out without an added liquid diluent. Normally, however, it is preferred to use a liquid diluent, the concentration of the monomer being in the range 5–20% by volume.

The catalyst systems of the present invention are generally sufficiently active for polymerisation to be initiated at normal ambient temperatures or below. The rate of polymerisation is generally increased by raising the temperature of the reaction mixture, but normally it is undesirable to employ temperatures far in excess of 150° C. It is preferred to carry out the reaction in the temperature range 15–90° C. It has further been found that the activity of the polymerisation initiator systems of the present invention are in some cases increased by heating the components of the system before the polymerisation reaction. It is preferred to heat them at a temperature above 50° C., for instance in the range 60 to 100° C., for a sufficient time to cause an increase in their catalytic activity.

The pressure in the reaction vessel in which the polymerisation is carried out is not critical and may be varied at will. It is advantageous when dealing with normally gaseous materials, to carry out the polymerisation process under slightly elevated pressures because in this way the handling of the materials is facilitated.

Polymerisation according to the present invention can be brought about by mixing the various ingredients of the reaction mixture in any order. Most suitably the components of the catalyst system are mixed before introducing the conjugated alkene. Preferably, when carrying out this technique, the metal halide is added to the lithium borohydride before the addition of the monomer or it can be added over a period of time in successive portions. During the polymersation further quantities of conjugated alkene, catalyst components and inert liquid vehicle can be added, if desired.

After the reaction has been completed, the polymer may be isolated by any of the known methods. It is particularly useful to treat the reaction mixture with an alcohol for example methanol, or ethanol or butanol containing a small quantity of water to decompose the catalyst. Where the polymer is dissolved in the liquid vehicle treatment with alcohol also serves to precipitate the polymer. The polymer is separated by filtration or decantation, washed and dried. If any further purification is required the polymer may be precipitated from a solvent by any of the usual methods.

The polymeric products of the process of the present invention are recovered from the reaction mixture by conventional means. The products are rubber-like materials which can be treated and compounded according to the methods known for treating and compounding natural and, previously known, synthetic rubbers. They find a wide selection of uses, for instance in electrical insulation and in the manufacture of shoesoles, tubing, tyres and the like.

The particular advantageous properties of the polymeric products of the present invention are believed to result from their particular molecular structure. Theoretically it is possible for a conjugated alkene to give rise to polymer chains having different molecular structures. For instance, 1:2 addition of butadiene can give rise to products having structural units

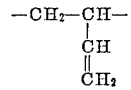

which can be joined either head to tail or head to head.

Furthermore, with 1:2 (or 3:4) addition, different types of stereoisomers may be formed due to the relative configurations of the asymmetric carbon atoms along the polymer-chains. These have been termed by Natta (Angewandte Chemie, 1956, 68, 393–403) isotactic and syndyotactic polymers. With substituted butadienes there are further possible products which are cis- and trans- isomers about the double bonds.

With 1:4 addition a polymer derived from butadiene has the following structural units:

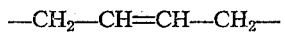

and there is the possibility of the geometric cis- and trans-isomerism with respect to the double bond in the 2:3-position of the unit. With unsymmetrical, substituted butadienes, there is the further variation of head to head or head to tail linking of the polymer units.

Most of the known polymerisation processes for conjugated alkenes often give rise to mixtures of some of the various possible isomeric polymers outlined above and it is believed that the advantageous properties of the products of the present invention depends on the fact that the polymerisation systems claimed favour the production of polymeric products having predominantly a particularly advantageous molecular structure. Thus the proportion of 1:2 or cis or trans 1:4 addition may be controlled by a suitable choice of the reaction conditions, for example, the molar ratio of catalyst components, and the concentrations of the monomer and catalyst.

The following examples are illustrative of the present invention. The parts by weight (p.b.w.) and the parts by volume (p.b.v.) bear the same relationship to each other as do grams to millilitres.

*Example 1*

0.97 p.b.w. of lithium borohydride and 3.1 p.b.v. of titanium tetrachloride are mixed under an atmosphere of nitrogen with 50 p.b.v. of benzene in a steel reaction vessel of 300 p.b.v. in capacity. The reactor is heated to a temperature of 100° C. and after 15 minutes cooled, and 23 p.b.w. of pure isoprene introduced into the reactor together with a further 100 p.b.v. of benzene with the exclusion of air. The temperature of the reaction vessel is raised to 60° C. and held there for forty minutes after which time it is allowed to fall. After some hours the contents of the vessel are removed and the polymer solution separated from the solid catalyst. The polymer is precipitated in acetone containing phenyl β-naphthylamine as antioxidant and then carefully dried. A good yield of rubbery polymer is obtained. Infra-red analysis indicates a very high proportion of cis-linkages within the polymerised isoprene units which are bonded together by 1:4-addition.

Similarly good yields of rubbery copolymers are obtained by copolymerising chloroprene and ethylene using the same polymerisation initiator as described above.

Example 2

0.98 p.b.w. of lithium borohydride and 17.6 p.b.w. of titanium tetrachloride are mixed under an atmosphere of nitrogen with 60 p.b.v. of toluene in a steel reaction vessel of 300 p.b.v. capacity. The reactor is heated to a temperature of 100° C. and after 10 minutes cooled, and 29 p.b.w. of butadiene-1,3 introduced into the reactor together with a further 143 p.b.v. of toluene. The reactor is warmed to 50° C. and then allowed to cool. After 18 hours the contents of the vessel are removed and the polymer precipitated in methanol containing phenyl β-naphthylamine as antioxidant. The precipitated polymer is filtered, washed and dried.

Examination of the infra-red absorption spectrum of a solution of the polymer in carbon disulphide shows that the polymer consists of butadiene units linked by 1:4-addition of which 55% are of the cis form and 45% the trans form. 1:2-addition amounts to only 10% of the trans 1:4-addition.

Repetition of the procedure of Example 2, replacing the titanium tetrachloride with an equivalent quantity of vanadium tetrachloride similarly gives rise to a good yield of polymer.

Example 3

1.11 p.b.w. of lithium borohydride and 4.06 p.b.w. of titanium tetrachloride are mixed under an atmosphere of nitrogen in a stainless steel reactor together with 50 p.b.v. of toluene. The reactor is heated to 100° C., cooled and 58 p.b.w. of butadiene-1,3 together with 200 p.b.v. of toluene introduced into the reactor. The reactor is heated to 50° C. and held at this temperature for four hours. The contents of the reactor are removed and the polymer precipitated in methanol containing phenyl β-naphthylamine as antioxidant. The precipitated polymer is filtered, washed and dried and isolated as a rubbery solid.

Examination of the infra-red absorption spectrum of the polymer shows that it consists of butadiene units linked by 1:4-addition of which 88% is of the cis form and 12% of the trans. 1:2-addition amounted to 10% of the trans 1:4-addition.

Example 4

A polymerisation initiator system is prepared by mixing 0.59 p.b.w. of lithium borohydride with 3.3 p.b.w. of titanium tetrachloride and 50 p.b.w. of benzene in a stainless steel reactor having a capacity of 300 p.b.v. under an atmosphere of nitrogen. The reactor is heated to 100° C. for 15 minutes, cooled, and 29.5 p.b.w. of butadiene-1,3 added together with additional benzene. The reactor is then heated to 60° C. and allowed to cool. After 18 hours the contents of the reactor are removed and the rubbery polymer isolated in a similar manner to that described in Examples 2 and 3.

Examination of the absorption spectrum of the polymer indicates that over 75% of the material consists of polymerised butadiene showing 1:4-addition and having a trans configuration and 12% of the material consists of polymerised butadiene units showing 1:2-addition.

Example 5

A polymerisation initiator system is prepared by mixing 1.07 p.b.w. of lithium borohydride with 8.94 p.b.w. of titanium tetrachloride and 50 p.b.v. of benzene in a stainless steel reactor having a capacity of 300 p.b.v. under an atmosphere of nitrogen. The reactor is heated to 100° C. for 15 minutes, cooled, and 23 p.b.w. of butadiene-1,3 added together with additional benzene. The reactor is then heated to 60° C. and allowed to cool. After 19 hours the contents of the reactor are removed and the rubbery polymer isolated in a similar manner to that described in Examples 2 and 3.

Examination of the infra-red absorption spectrum of the polymer indicates that over 77% of the material consists of polymerised butadiene showing 1:4-addition and having a trans configuration and 9% of the material consists of polymerised butadiene units showing 1:2-addition.

Example 6

A polymerisation initiator system is prepared by mixing 1.1 p.b.w. of lithium borohydride with 13.0 p.b.w. of titanium tetrachloride and 50 p.b.v. of benzene in a stainless steel reactor having a capacity of 300 p.b.v. under an atmosphere of nitrogen. The reactor is heated to 100° C. for 15 minutes, cooled, and 35 p.b.w. of butadiene-1,3 added together with additional benzene. The reactor is then heated to 60° C. and allowed to cool. After 19 hours the contents of the reactor are removed and the rubbery polymer isolated in a similar manner to that described in Examples 2 and 3.

Examination of the infra-red absorption spectrum of the polymer indicates that over 77% of the material consists of polymerised butadiene showing 1:4-addition and having a trans configuration and 9% of the material consists of polymerised butadiene units showing 1:2-addition.

Example 7

A polymerisation initiator system is prepared by mixing 1.16 p.b.w. of lithium borohydride with 3.4 p.b.w. of titanium tetrachloride and 50 p.b.v. of benzene in a stainless steel reactor having a capacity of 300 p.b.v. under an atmosphere of nitrogen. The reactor is heated to 100° C. for 15 minutes, cooled, and 20 p.b.w. of butadiene-1,3 added together with additional benzene. The reactor is then heated to 60° C. and allowed to cool. After 17 hours the contents of the reactor are removed and the rubbery polymer isolated in a similar manner to that described in Examples 2 and 3.

Examination of the infra-red absorption spectrum of the polymer indicates that over 66% of the material consists of polymerised butadiene showing 1:4-addition and having a trans configuration and 22% of the material consists of polymerised butadiene units showing 1:2-addition.

We claim:

1. A process for the polymerisation of a conjugated alkene which comprises contacting the alkene in a liquid reaction medium with a polymerisation initiator system formed by mixing 1 molecular equivalent of lithium borohydride with from 0.3 to 3 molecular equivalents of a halide of a metal selected from the group consisting of titanium, zirconium and vanadium.

2. A process as claimed in claim 1, wherein the conjugated alkene is butadiene-1,3.

3. A process as claimed in claim 1, wherein the conjugated alkene is isoprene.

4. A process as claimed in claim 1 wherein the metal halide is soluble in the liquid reaction medium.

5. A process as claimed in claim 1, wherein the metal halide is titanium tetrachloride.

6. A process as claimed in claim 1, wherein the metal halide is vanadium tetrachloride.

7. A process as claimed in claim 1, wherein the polymerisation initiator concentration lies between 0.1 and 1 gram per 100 millilitres of liquid reaction mixture.

8. A process as claimed in claim 1, wherein the liquid reaction medium consists of a member of the group consisting of benzene, toluene, and xylene.

9. A process as claimed in claim 1, wherein the polymerisation reaction is carried out at a temperature in the range 15° C. to 90° C.

10. A process for the copolymerisation of a conjugated alkene which comprises contacting in a liquid reaction medium the alkene and a copolymerizable compound selected from the group consisting of a mono-olefinic aliphatic compound, a mono-olefinic cyclo-aliphatic compound, a mono-olefinic aryl substituted alkene and a polyolefinic non-conjugated hydrocarbon with a polymerization initiator system formed by mixing 1 molecular equivalent of lithium borohydride with from 0.3 to 3 molecular equivalents of a halide of a metal selected from the group consisting of titanium, zirconium and vanadium, the amount by weight of said conjugated alkene polymerized being at least 50% of the copolymer formed.

11. A polymerization initiator formed by mixing one molecular equivalent of lithium borohydride with from 0.3 to 3 molecular equivalents of a halide of a metal selected from the group consisting of titanium, zirconium and vanadium.

References Cited in the file of this patent

UNITED STATES PATENTS

| | | |
|---|---|---|
| 2,822,357 | Brebner et al. | Feb. 4, 1958 |
| 2,832,759 | Nowlin et al. | Apr. 29, 1958 |

FOREIGN PATENTS

| | | |
|---|---|---|
| 538,782 | Belgium | Dec. 6, 1955 |
| 1,160,864 | France | Aug. 12, 1958 |
| 801,401 | Great Britain | Sept. 10, 1958 |